Patented Dec. 24, 1940

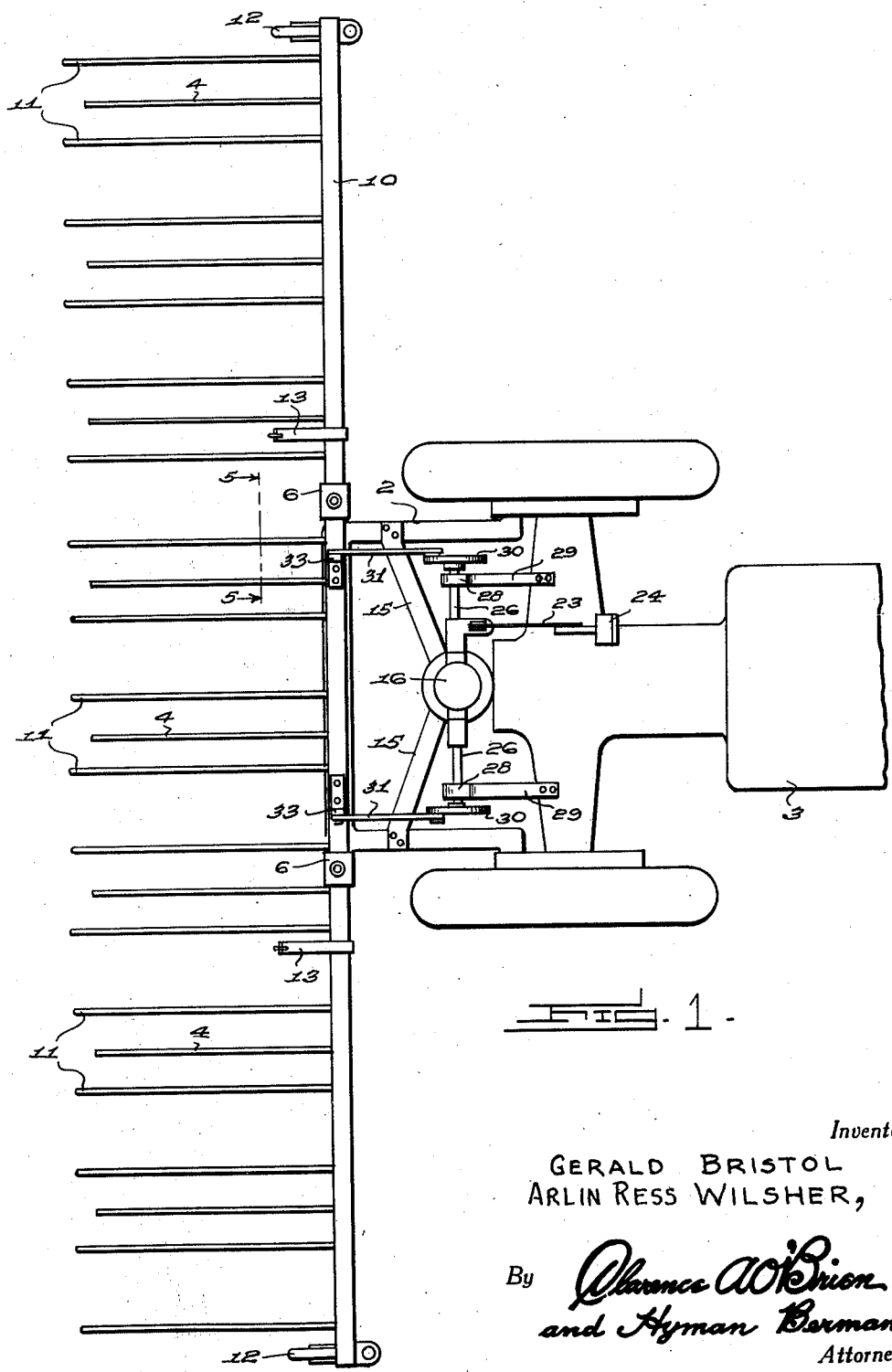

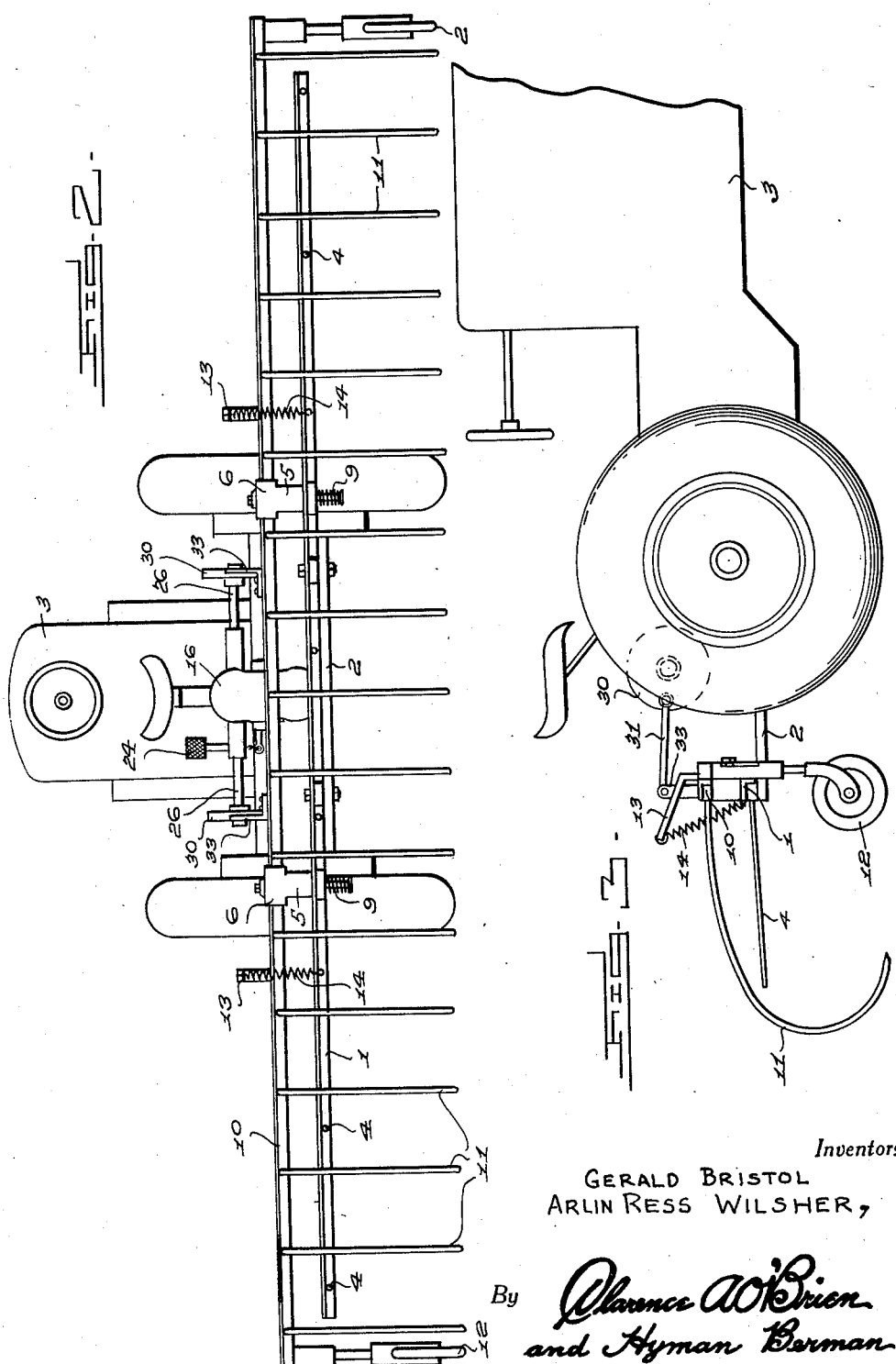

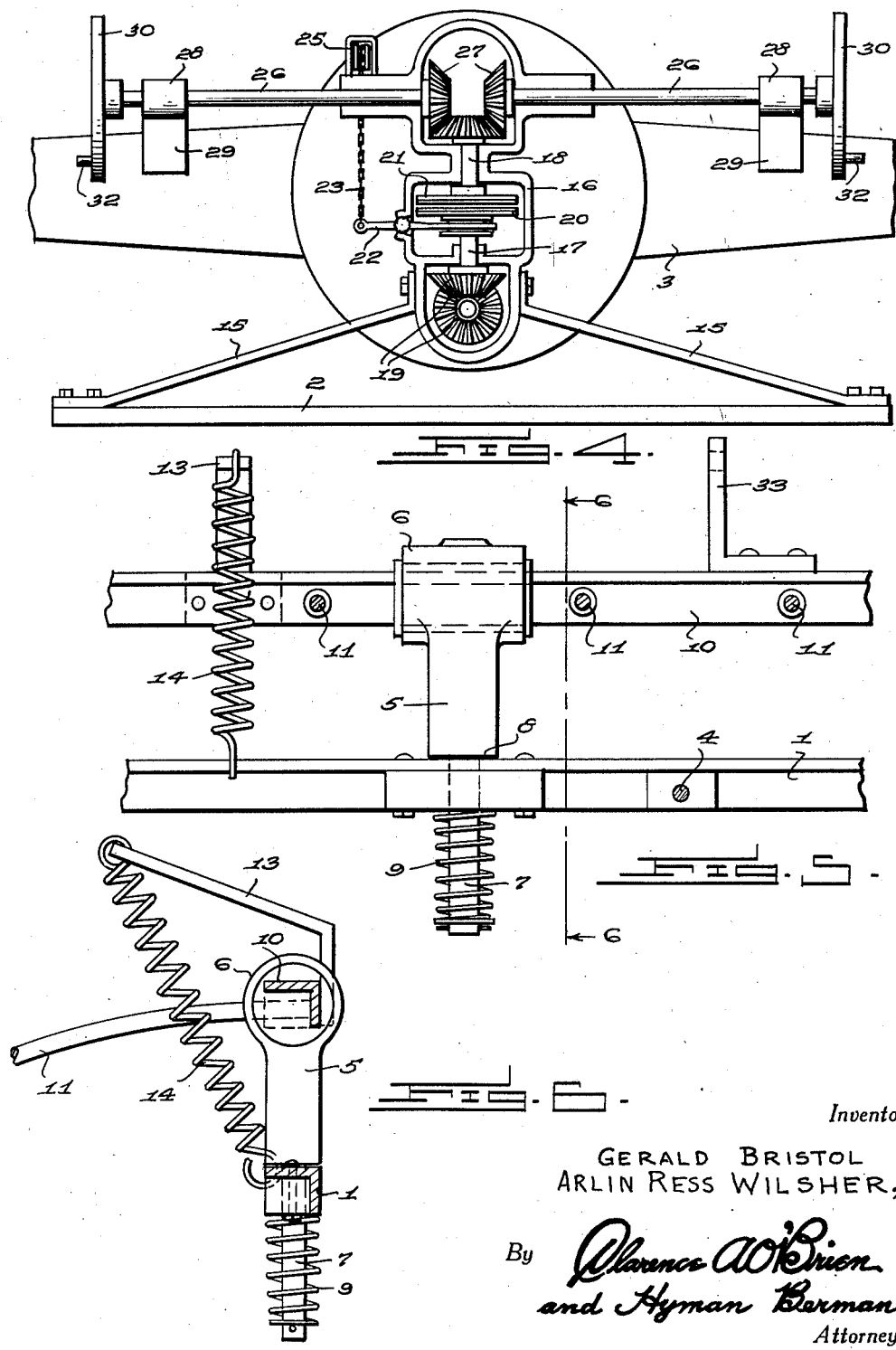

2,226,460

UNITED STATES PATENT OFFICE 2,226,460

POWER RAKE

Gerald Bristol and Arlin Ress Wilsher, San Perlita, Tex., assignors of one-fourth to Steven Riley Cantrell and one-fourth to James Wright Shirley, both of San Perlita, Tex.

Application February 23, 1940, Serial No. 320,487

3 Claims. (Cl. 56—27)

The present invention relates to new and useful improvements in power rakes and has for its primary object to provide, in a manner as hereinafter set forth, a device of this character which is adapted to be mounted for operation on conventional tractors.

Another very important object of the invention is to provide novel means for operatively connecting the rake to the power take off of the tractor to be lifted thereby for dumping.

Still another important object of the invention is to provide a rake of the character described comprising means for maintaining said rake a predetermined distance above the ground at all times, as when the tractor enters a depression.

A still further important object of the invention is to provide a rake of the character set forth wherein the power lift may be conveniently controlled from the operator's seat of the tractor.

Other objects of the invention are to provide a rake of the character set forth which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a rake constructed in accordance with the present invention.

Figure 2 is a view in rear elevation thereof.

Figure 3 is a side elevational view.

Figure 4 is a view in rear elevation of the power lift mechanism, the housing being shown open to expose the gears.

Figure 5 is a view in vertical section through an intermediate portion of the invention, taken substantially on the line 5—5 of Fig. 1.

Figure 6 is a vertical sectional view, taken substantially on the line 6—6 of Fig. 5.

Referring now to the drawings in detail, it will be seen that the embodiment of the invention which has been illustrated comprises a metallic trash guard bar 1 which is rigidly secured in any suitable manner to the usual draw bar 2 of a tractor 3. Projecting rearwardly from the bar 1 are rods 4. The rods 4 constitute trash guards.

Mounted for vertical sliding movement on the bar 1 are posts 5 having horizontal bearings 6 on their upper ends. The posts 5 include reduced lower end portions 7 which extend slidably through the bar 1, thus providing shoulders 8 which are adapted to seat on said bar. Coil springs 9 below the bar 1 are operatively connected to the reduced lower portions 7 of the posts 5 for yieldingly resisting upward sliding movement of said posts.

Journaled for rocking movement in the bearings 6 is a bar 10 having teeth 11 mounted thereon. Any suitable means may be provided for lubricating the bearings 6. The tooth bar 10 extends beyond the ends of the guard bar 1 and has mounted on its end portions for limited swinging movement in a horizontal plane caster wheels 12. The reference numeral 13 designates arms which are fixed on the tooth bar 10 at spaced points. Coil springs 14 have one end connected to the guard bar 1 and their other ends connected to the arms 13 for returning the rake to lowered position after it has been raised. As will be readily apparent, the coil springs 14 yieldingly resist lifting of the rake.

Mounted on the side portions of the draw bar 2 are metallic bars 15 which support a housing 16 adjacent the rear of the differential of the tractor 3. Journaled in the housing 16 are vertically aligned shafts 17 and 18. The lower vertical shaft 17 is adapted to be driven from the power take off of the tractor 3 by means including beveled gears 19. Splined on the upper end portion of the shaft 17 is a clutch member 20 which is engageable with a stationary clutch member 21 on the lower end portion of the shaft 18. A rockable, forked lever 22 is provided for actuating the clutch member 20. A chain 23 connects the clutch lever 22 to a foot lever 24 for actuation thereby, said lever 24 being positioned on the tractor 3 for actuation by the operator of said tractor. The chain 23 travels over a pulley 25 which is provided therefor on the housing 16.

The reference numeral 26 designates a pair of transversely aligned shafts having one end portion journaled in the upper portion of the housing 16. Beveled gears 27 connect the shafts 26 to the shaft 18 for actuation thereby. The outer portions of the shafts 26 are journaled in bearings 28 on the free end portions of metallic arms 29 which project rearwardly from the tractor 3. Discs 30 are fixed on the outer end portions of the shafts 26. Pitmans 31 have one end journaled on crank pins 32 on the discs 30 and their other ends pivotally connected to brackets 33 which rise from the tooth bar 10.

It is thought that the operation of the invention will be readily apparent from a consideration of the foregoing. As the rake travels over the ground behind the tractor 3 it is normally held down by the coil springs 9, also the springs 14. When it is desired to dump the rake, the operator of the tractor simply actuates the lever 24 for engaging the clutch member 20 with the clutch member 21. Thus, the shafts 26 with the discs 30 thereon are rotated. Then, through the medium of the pitmans 31 the bar 10 with the teeth 11 thereon is rocked in a manner to dump the rake against the tension of the springs 14. One revolution of the discs 30 raises and lowers the rake. When the rake is raised for dumping, the rods 4 clean the hay, trash, etc., therefrom. The weight of the bar 10 is normally carried by the bar 1. However, should the tractor enter a depression this weight is transferred to the caster wheels 12 which now support the bar 10 and elevate said bar 10 relative to the bar 1 against the tension of the coil springs 9. Thus, the rake is maintained at the correct operating position above the ground. Of course, after the tractor moves out of the depression the toothed bar 10 returns to its former position on the guard bar 1.

It is believed that the many advantages of a rake constructed in accordance with the present invention will be readily understood and although a preferred embodiment is as illustrated and described, it is to be understood that changes in the details of construction and in the combination and arrangement of parts may be resorted to which will fall within the scope of the invention as claimed.

What is claimed is:

1. A rake of the class described comprising a bar for mounting on a vehicle, posts mounted for vertical sliding movement on said bar, a tooth bar rockably mounted on said posts, teeth mounted on said tooth bar, trash guards mounted on the first named bar, springs operatively connected to the posts for yieldingly resisting upward movement thereof relative to the first named bar, means for rocking the tooth bar for raising and lowering the teeth, and wheels mounted on the tooth bar and engageable with the ground for supporting said tooth bar a predetermined distance above said ground.

2. In combination with a tractor including a power take off and a draw bar, a transversely extending bar mounted on said draw bar, trash guards on said transverse bar, posts mounted for vertical sliding movement on the transverse bar and including reduced lower end portions extending slidably therethrough, coil springs operatively connected to said reduced lower portions of the posts for yieldingly resisting upward movement of said posts on the transverse bar, bearings on the upper ends of the posts, a tooth bar journaled for rocking movement in the bearings, teeth on said tooth bar, arms mounted on the tooth bar, coil springs connecting the arms to the transverse bar for yieldingly resisting rocking movement of the tooth bar in one direction, caster wheels mounted on the end portions of the tooth bar and engageable with the ground for supporting said tooth bar a predetermined distance thereabove, and means operatively connecting the tooth bar to the power take off of the tractor for rocking movement thereby.

3. In combination with a tractor including a power take off, a rake rockably mounted on the tractor, and means operatively connecting the rake to the power take off for raising and lowering thereby, said means including a casing mounted on the tractor, aligned shafts journaled in said casing, gears operatively connecting one of the shafts to the power take off, coacting clutch members in the casing operatively connecting the other shaft to said one shaft for actuation thereby, a pair of horizontal shafts extending rotatably into the casing, gears operatively connecting the last named shafts to said other shaft for actuation thereby, and means including pitmans operatively connecting the rake to said last named shafts for rocking movement thereby.

ARLIN RESS WILSHER.
GERALD BRISTOL.